Oct. 10, 1933.  F. G. POLLEY  1,929,824
PRESS PLATE OR THE LIKE AND METHOD OF MAKING THE SAME
Filed May 12, 1931   2 Sheets-Sheet 1
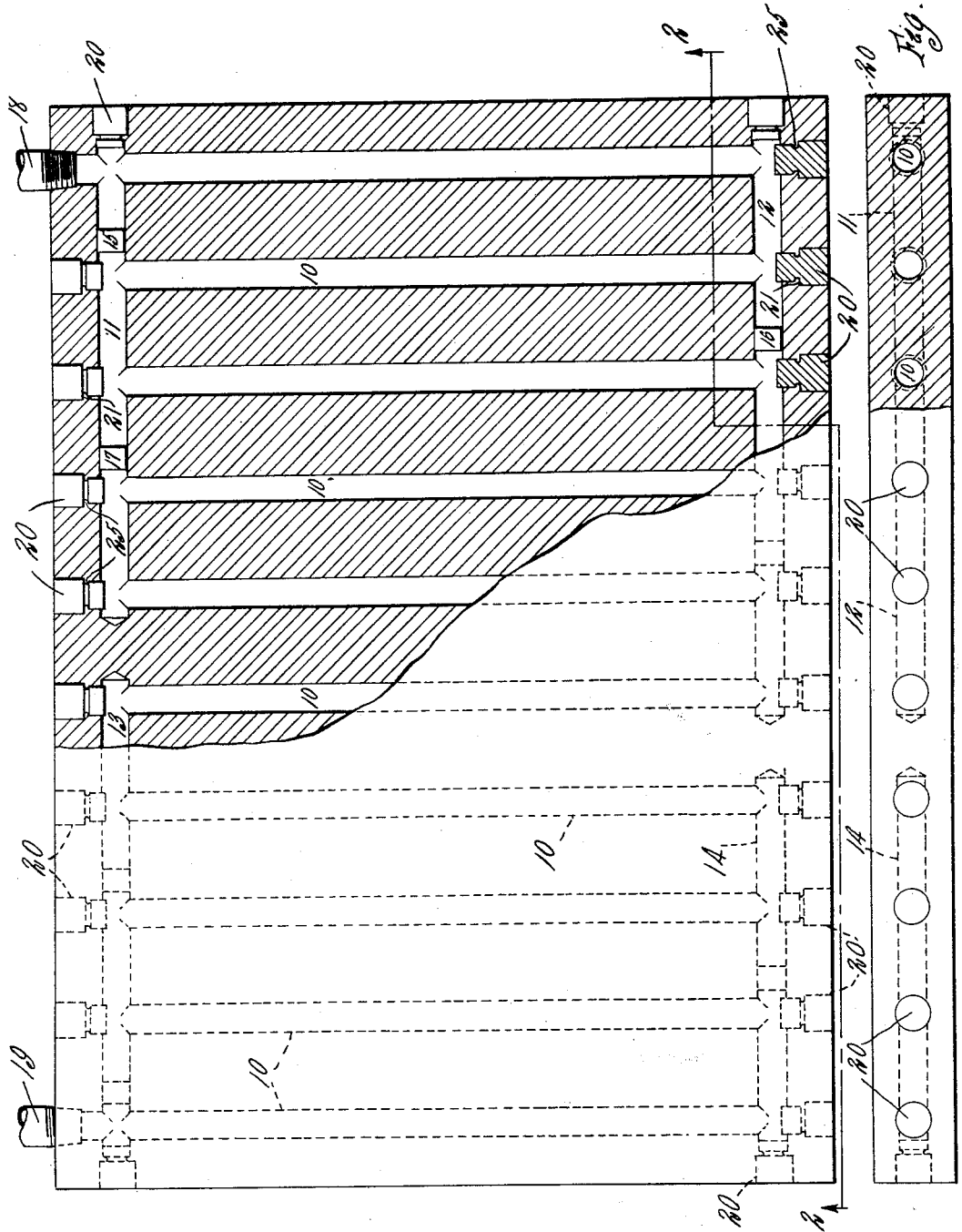
INVENTOR
Frank G. Polley
by Parker + Prochnow
ATTORNEYS Oct. 10, 1933.    F. G. POLLEY    1,929,824
PRESS PLATE OR THE LIKE AND METHOD OF MAKING THE SAME
Filed May 12, 1931    2 Sheets-Sheet 2

INVENTOR
Frank G. Polley
by Parker & Burchnow
ATTORNEYS

UNITED STATES PATENT OFFICE 1,929,824

PRESS PLATE OR THE LIKE AND METHOD OF MAKING THE SAME

Frank G. Polley, Piqua, Ohio, assignor to The French Oil Mill Machinery Co., Piqua, Ohio Application May 12, 1931. Serial No. 536,736

7 Claims. (Cl. 29—148)

This invention relates to metal plates, such as employed in hot plate presses, which are formed with plugged bores or passages in the body of the plate for the circulation of a heating or cooling medium, and to the method of plugging or closing the passages in such plates.

Presses, commonly known as "hot plate presses", are extensively used for molding and vulcanizing or curing articles made from rubber, synthetic resins and other plastic materials, and also for performing, embossing, forming, straightening and other operations.

These presses are equipped with metal pressure plates or members of one or another design having ports or passages formed therein for the circulation of a fluid medium, such for example as steam oil or water, for heating or cooling the plates and the work being operated upon. The fluid circulation passages in such plates may be made by coring or drilling and may extend inwardly partway through the plate from one edge thereof, or may extend through the plate from one to another edge thereof. For instance, in one known arrangement, parallel passages extend through the plate from one edge to the opposite edge thereof, and these passages are connected one to another by intersecting cross passages so that the heating or cooling medium admitted to one passage may circulate through the several passages in the plate. The ends of the passages that extend to the edge or edges of the plate are usually closed or stopped by means of suitable plugs secured therein, and the cross or connecting passages may be closed at certain points between the other passages by means of plugs or baffles so as to cause the heating or cooling medium to follow a circuitous course through the passages.

Herefore it has been the practice to close the ends of the passages at the edge or edges of the plate by means of screw plugs screwed into the threaded ends of the passages, or by means of plugs which are secured in place by welding, and to close the cross or connecting passages between the other passages by means of plugs inserted through additional holes extending into the plate from an edge thereof to the cross passage so that the plugs in these additional holes will cross and close the connecting passages. The screw plugs are objectionable because they are apt to leak, especially when the plates are subject to sudden changes in temperature, as when alternately circulating a heating and a cooling medium through the passages, and the welded plugs are objectionable because of additional expense of the welding operation and the unsightly appearance of the edge of the plate caused by the welding. The use of plugs inserted in special holes in the plate to form the baffles in the cross passages is also objectionable because of the added cost of drilling or forming the additional holes for these plugs.

One object of my invention is to close the ends of the passages of such plates or analogous metal members by novel means which insure perfect fluid-tight closures of the passages and also produce a neat, finished appearance for the edges of the plates or members.

Other objects of the invention are to provide a novel method of plugging the holes or passages in plates or members of the character mentioned; to provide a plate in which the ends of the passages at the edges of the plate are closed by means of plugs which are retained in place by interengaging, integral portions of the plug and plate; also to close the ends of the passages in such plates by means of a plug which is driven or forced into each passage in such a manner as to cause the metal of one of the parts (the plug or the plate) to flow or be extruded into a recess in the other part, to thereby secure the plug in place and form a fluid-tight joint between the plug and the wall of the passage; also to form the baffles in the connecting passages of such plates in a novel manner; and also to improve and reduce the cost of such plates and the method of making the same in the respects hereinafter described and set forth in the claims.

In the accompanying drawings:

Fig. 1 is a plan view, partly in section, of a plate embodying my invention.

Fig. 2 is an edge view thereof, partly in section, on line 2—2, Fig. 1.

Figure 3:
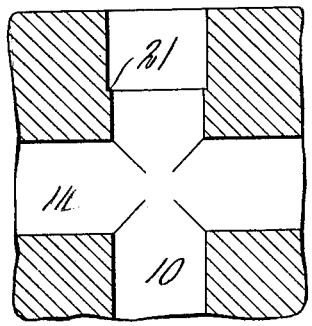
Fig. 3 is an enlarged, sectional plan view of a portion of the plate showing two intersecting passages thereof before the plugs for closing the passages have been inserted.

The plate shown in Figs. 1 and 2, as one embodiment of my invention, is provided with a series of passages 10 which extend parallel with each other through the plate from one side edge to the opposite side edge of the plate, and 11 and 12 represent respectively cross passages which extend into the plate from one end edge thereof and intersect several of the passages 10, near the opposite ends of these passages. 13 and 14 represent similar cross passages which extend into the plate from the opposite end edge thereof and intersect the remaining passages 10. The ends of the passages 10 are closed or plugged as hereinafter explained. The connecting passage 11 is closed by a plug or baffle 15 between the first two passages 10 at the right hand end of the plate, as seen in Fig. 1, and the passage 12 is similarly closed by a plug 16 between the second and third passages 10. A third plug 17 closes the cross passage 11 between the third and fourth passages 10. The cross passages 11, 12, 13 and 14 are thus closed alternately by similar plugs between successive passages 10, as shown in Fig. 1. With this arrangement of the passages and plugs a fluid admitted to one end of the first passage 10 by an inlet pipe 18 may flow through this passage 10 into the cross passage 12, then through the second passage 10 and the cross passage 11 into and through the third passage 10, and so on so that the fluid admitted to the first passage 10 will circulate through the several passages 10 in succession and discharge through an outlet pipe 19 at the opposite end of the plate. The ends of the parallel passages 10 at opposite side edges of the plate beyond the connecting passages 11 and 12 are closed or stopped by plugs 20.

It will be understood that the form of the plate and arrangement of the passages shown in Figs. 1 and 2 are only illustrative of one embodiment of my invention, and that the invention is not limited to a plate of this form or arrangement of the passages but is applicable to plates or members of other form and having passages differently arranged or adapted for other purposes, but which have to be plugged or closed.

The method illustrated in Figs. 3–5, for plugging the ends of the plate passages is as follows: The outer end of each passage 10 is counterbored to form a narrow, circumferential shoulder or ledge 21 in the passage 10 disposed inwardly from the outer edge of the plate. The plug 20 is made with an outer portion of a diameter to tightly fit within the counterbore or large outer portion of the passage 10, and an inner portion 22 of smaller diameter to tightly fit within the smaller portion of the passage, the plug being provided with a circumferential shoulder 23 adapted to abut against the shoulder 21 in the passage. The plug is also provided in its smaller portion adjoining the shoulder 23 with a shallow, circumferential groove 24. In applying the plug, it is forced into the passage 10 until its shoulder 23 engages the shoulder 21 in the passage. The outer end of the plug will then project slightly beyond the edge of the plate, as indicated in Fig. 4. Then the plug is forced or driven further into the passage, preferably until its outer end is flush with the edge of the plate, thereby causing the metal of the wall of the passage 10 adjoining its shoulder 21 to flow or be extruded into said groove 24 and forming an internal circumferential bead or projection 25, (see Fig. 5) on the wall of the passage which projects into and fills the groove 24 in the plug. The plug is thus secured in place in the end of the passage and a fluid-tight joint is formed which will prevent leakage through the joint between the passage and plug.

Figure 4:
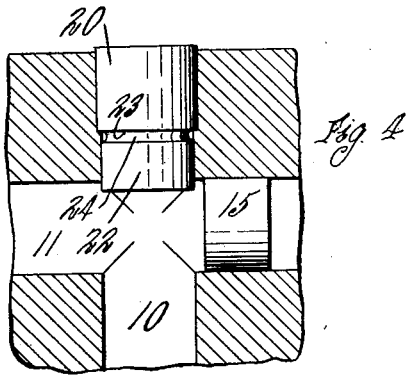
Figs. 4 and 5 are similar views showing successive steps in one method embodying my invention, of securing the plugs in place in the passages.
Figure 5:
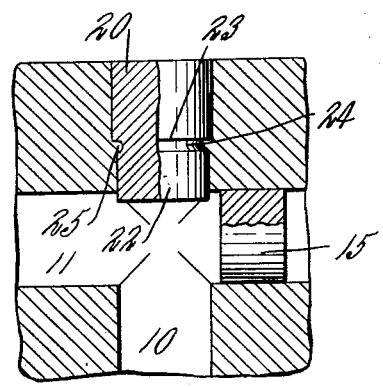
Figure 6:
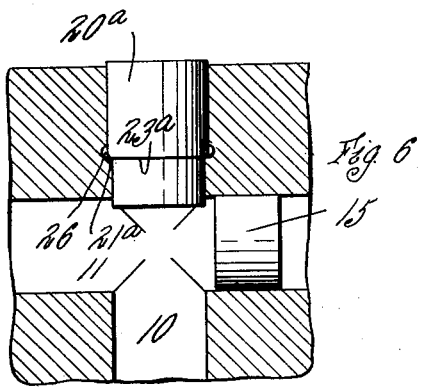
Figs. 6 and 7 are views similar respectively to Figs. 4 and 5 but showing successive steps of a slightly modified method embodying the invention, of securing the plugs in place in the passages.
Figure 7:
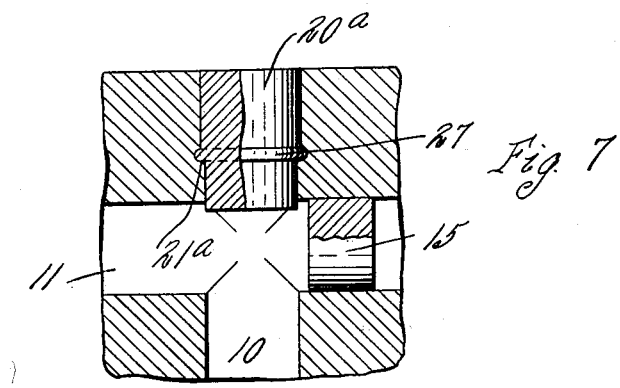

The construction and method illustrated in Figs. 6 and 7 is similar to that illustrated in Figs. 3–5, and just explained, except that in the method illustrated in Figs. 6 and 7, a shallow, circumferential groove 26 is formed in the wall of the passage 10 adjoining the shoulder 21a of the passage, see Fig. 6, instead of forming the groove in the plug, as before explained. The plug 20a, however, is provided, as before, with a circumferential shoulder 23a, see Fig. 6. By driving or forcing the plug 20a into the passage, the shoulder 23a of the plug will abut the shoulder 21a of the passage, and the necessary further pressure or force on the plug will cause the shouldered portion of the plug to flow or be extruded into the groove 26 in the passage, thus forming a circumferential bead or projection 27 on the plug, see Fig. 7, which projects into and fills the groove 26.

Thus, the method illustrated in Figs. 6 and 7 is similar to that illustrated in Figs. 3–5, except that in the first method the metal of the plate is displaced, extruded or caused to flow into and fill a groove in the plug, whereas in the second method the metal of the plug is displaced or caused to flow into and fill the groove in the plate. In either case, the plug is preferably forced into the passage until the outer end of the plug is flush with the edge of the plate, thereby leaving a smooth, finished edge on the plate, free from projections or depressions.

The plug can be driven or forced into the passage so as to extrude, displace, or cause the flow of the metal, as explained, by a power hammer, hydraulic press or other means affording the necessary pressure. It will be understood that the area of contact between the shoulder 23 of the plug and the shoulder 21 in the passage is relatively small and that the pressure required to drive the plug into place and cause the described displacement of the metal and interlock between the plug and place will depend upon the area of contact between these shoulders and the nature of the steel or metal of which the plate and plug are made.

It will be understood that the end of each of the passages in the plate which requires to be plugged or closed may be closed by one of the plugs secured in place by one or the other of the methods explained. In the plate illustrated in Figs. 1 and 2, the opposite ends of the parallel passages 10 are closed in this way and also the ends of the connecting passages 11, 12, 13 and 14. The heating or cooling medium which is circulated through the passages of the plate is never used under a pressure sufficient to break the interlock between the plug and plate and force the plug out of place.

The plugs 15, 16 and 17, used for closing or damming the connecting passages 11 and 12, etc. between the passages 10 are preferably formed by plain, cylindrical metal plugs which are forced into the connecting passages to the required points and tightly fit in the passages. These plugs can be made inexpensively by cutting proper lengths from a cylindrical metal rod. Preferably the inner ends of the plugs 20 which close the ends of the passages 10 project into the connecting passages 11 and 12, etc. into the path of the plugs 15, 16 and 17, to prevent the latter plugs from being moved out of the intended position in their passages or to positions in which they might obstruct the passages 10.

I claim as my invention:

1. The method of plugging a passage extending into hot plate presses from a face thereof, comprising forcing a metal plug into said passage until a circumferential shoulder on the plug between its ends abuts against a shoulder initially formed on the wall of said passage between the ends of the passage, and further forcing the plug into the passage thereby extruding the metal adjoining the shoulder on one of said parts into a recess in the other part.

2. The method of plugging a passage extending into hot plate presses from a face thereof, comprising forcing a metal plug into said passage until a circumferential shoulder on the plug connecting an enlarged outer and a reduced inner portion of the plug abuts against a shoulder on the wall of said passage connecting corresponding outer and inner portions of the passage, and further forcing the plug into the passage until the outer end of the plug is flush with said face of the plate and the metal adjoining the shoulder on one of said parts is extruded into a recess in the other part.

3. The method of plugging a passage extending into hot plate presses from a face thereof, comprising counterboring the outer portion of said passage and forming a circumferential shoulder on the wall of the passage at the juncture of said counterbored and other portion of the passage, providing a plug having inner and outer portions of different diameters respectively fitting the inner and outer portions of said passage and a shoulder adapted to abut said shoulder of the passage, and forcing said plug into said passage through its counterbored outer end and applying pressure to said plug while said shoulders are in contact thereby extruding the metal adjoining the shoulder on one of said parts into a recess formed in the other part.

4. A hot plate press having a passage extending thereinto from a face of the plate, a passage intersecting said first mentioned passage, a plug secured in and closing said first mentioned passage outwardly beyond said intersecting passage, and a plug located in and closing said intersecting passage at one side of said other passage, the inner end of said first mentioned plug projecting into said intersecting passage in the path of and preventing displacement of said other plug.

5. A hot plate press having a plurality of passages therein closed at their ends, passages intersecting and connecting said first mentioned passages, and a plug located in and closing each of said connecting passages between alternating pairs of said first mentioned passages, said plugs being insertible into place in each of said connecting passages from one end of the latter.

6. A metal platen plate for hot plate presses having a passage extending thereinto from an edge of the plate, and a metal plug closing said passage, said plug and passage having initially integral circumferential shoulders between the ends of said plug and of said passage connecting corresponding enlarged and reduced portions of said passage and plug and adapted to abut each other, and one of said parts having an integral displaced portion thereof projecting into a recess in the other part adjoining its shoulder.

7. A metal platen plate for hot plate presses having a passage extending thereinto from an edge of the plate, said passage having initially an inner portion of reduced diameter and an outer portion of enlarged diameter forming a circumferential shoulder in said passage between its ends, and a metal plug insertable through said enlarged outer portion of the passage and having inner and outer portions respectively fitting the inner and outer portions of said passage, and a shoulder adapted to abut said shoulder of the passage, one of said metal parts having an integral displaced circumferential projection entering a circumferential recess in the other part adjoining its shoulder.

FRANK G. POLLEY.